(12) United States Patent
Gies et al.

(10) Patent No.: US 8,749,552 B2
(45) Date of Patent: Jun. 10, 2014

(54) SYNTHETIC ACCELERATION SHAPES FOR USE IN RAY TRACING

(75) Inventors: Sean Matthew Gies, San Francisco, CA (US); James Alexander McCombe, San Francisco, CA (US); Luke Tilman Peterson, Oakland, CA (US)

(73) Assignee: Imagination Technologies Limited, Kings Langley, Hertfordshire (GB)

( * ) Notice: Subject to any disclaimer, the term of this patent is extended or adjusted under 35 U.S.C. 154(b) by 1038 days.

(21) Appl. No.: 12/571,768

(22) Filed: Oct. 1, 2009

(65) Prior Publication Data

US 2010/0097372 A1    Apr. 22, 2010

Related U.S. Application Data

(60) Provisional application No. 61/106,255, filed on Oct. 17, 2008, provisional application No. 61/164,205, filed on Mar. 27, 2009.

(51) Int. Cl.
*G06T 15/50* (2011.01)
*G06T 15/60* (2006.01)

(52) U.S. Cl.
USPC ....................................................... 345/426

(58) Field of Classification Search
CPC .... G06T 15/06; G06T 17/005; G06T 2210/12
See application file for complete search history.

(56) References Cited

U.S. PATENT DOCUMENTS

| | | | |
|---|---|---|---|
| 5,574,835 A * | 11/1996 | Duluk et al. | 345/421 |
| 5,613,049 A * | 3/1997 | Brechner et al. | 345/420 |
| 5,933,146 A * | 8/1999 | Wrigley | 345/420 |
| 7,012,604 B1 | 3/2006 | Christie et al. | |
| 7,289,118 B2 | 10/2007 | Schmittler et al. | |
| 7,408,548 B2 * | 8/2008 | Guenter et al. | 345/420 |
| 8,289,324 B1 * | 10/2012 | Laine et al. | 345/426 |
| 8,411,080 B1 * | 4/2013 | Zimmermann | 345/419 |
| 8,411,087 B2 * | 4/2013 | Wei et al. | 345/426 |

(Continued)

FOREIGN PATENT DOCUMENTS

WO   WO 2008/037599 A1   4/2008

OTHER PUBLICATIONS

Zhang et al.; k-IOS: Intersection of Spheres for Efficient Proximity Query; 2012 IEEE International Conference on Robotics and Automation; May 2012.*

(Continued)

*Primary Examiner* — Carlos Perromat
(74) *Attorney, Agent, or Firm* — Michael S. Garrabrants

(57) ABSTRACT

A synthetic acceleration shape bound primitives composing a 3-D scene, and is defined using a group of fundamental shapes arranged to bound the primitives, and for which intersection results for group members yield an ultimate intersection testing result for the synthetic shape, using a logical operator. For example, two or more spheres are used to bound an object so that each of the spheres is larger than a minimum necessary to bound the object, and a volume defined by an intersection between the shapes defines a smaller volume in which the object is bounded. A ray is found to potentially intersect the object only if it intersects both spheres. In another example, an element may be defined by a volumetric union of component elements. Indicators can determine how groups of shapes should be interpreted. Synthetic shapes can be treated as a single element in a graph or hierarchical arrangement of acceleration elements.

25 Claims, 10 Drawing Sheets

(56) References Cited

U.S. PATENT DOCUMENTS

| | | | |
|---|---|---|---|
| 8,416,260 B1* | 4/2013 | Carpenter et al. | 345/619 |
| 8,471,845 B1* | 6/2013 | Stich | 345/419 |
| 2002/0163515 A1* | 11/2002 | Sowizral et al. | 345/419 |

OTHER PUBLICATIONS

Krishnan et al.; Spherical Shell: A Higher Order Bounding Volume for Fast Proximity Queries; WAFR '98 Proceeding of the Third Workshop on the Algorithmic Foundations of Robotics on Robotics: the Algorithmic Perspective; pp. 177-190; 1998.*

Bradshaw et al.; Adaptive Medial Axis Approximation for Sphere-Tree Construction; ACM Transaction on Graphics (TOG); ACM 2004.*

Gottschalk et al.; OBBTree: a hierarchical structure for rapid interference detection. In Proceedings of the 23rd annual conference on Computer graphics and interactive techniques (SIGGRAPH '96). ACM, New York, NY, USA, 171-180; 1996.*

Bonner et al.; A Representation Scheme for Rapid 3-D Collision Detection; IEEE 1989.*

Erleben; An Introduction to Approximate Heterogeneous Bounding Volume Hierarchies; Technical Report; Department of Computer Science, University of Copenhagen; 2002.*

Barney; Introduction to Parallel Computing; https://computing.llnl.gov/tutorials/parallel_comp/; Lawrence Livermore National Laboratory; dated Jul. 15, 2013.*

Jeffrey A. Mahovsky, "Ray-Tracing with Reduced-Precision Bounding Volume Hierarchies," PhD thesis, University of Calgary, Alberta, Canada, 2005.

E. Groller and W. Purgathofer, "Coherence in Computer Graphics," Institute for Computer Graphics, Technical, University Vienna, Vienna, Austria, in Transactions on Information and Communications Technologies, vol. 5, 1993 WIT Press.

Eric Larsen, Stefan Gottschalk, Ming C. Lin, and Dinesh Manocha, "Fast Distance Queries with Rectangular Swept Sphere Volumes," Proceedings of IEEE International Conference on Robotics and Automation, San Francisco, CA, 2000, vol. 4, pp. 3719-3726.

K. R. Subramanian and Donald S. Fussell, "A Search Structure based on K-d Trees for Efficient Ray Tracing," PhD thesis, The University of Texas at Austin, Dec. 1990.

James T. Klosowski, Martin Held, Joseph S.B. Mitchell, Henry Sowizral and Karel Zikan, "Efficient Collision Detection Using Bounding Volume Hierarchies of k-DOPs," IEEE Transactions on Visualization and Computer Graphics, Jan. 1998, vol. 4, issue 1, pp. 21-36.

Hank Weghorst, Gary Hooper and Donald P. Greenberg, "Improved Computational Methods for Ray Tracing," ACM Transactions on Graphics (TOG), Jan. 1984, vol. 3, issue 1, pp. 52-69.

Frederic Cazals, George Drettakis and Claude Puech, "Filtering, Clustering and Hierarchy Construction: a New Solution for Ray-Tracing Complex Scenes," Computer Graphics Forum (Eurographics '95) 14, 3.

Christian Lauterbach, Sung-Eui Yoon, David Tuft and Dinesh Manocha, "RT-Deform: Interactive Ray Tracing of Dynamic Scenes using BVHs," In Proceedings of the 2006 IEEE Symposium on Interactive Ray Tracing, Salt Lake City, UT, Sep. 18-20, 2006.

P. H. Christensen, J. Fong, D. M. Laur and Dana Batali, "Ray Tracing for the Movie 'Cars'," IEEE Symposium on Interactive Ray Tracing, 2006, pp. 1-6.

Eric Haines, "Ray Tracing News: Light Makes Right" [Online], vol. 2, No. 8, Oct. 27, 1989. Retrieved from the Internet: URL:http://tog.acm.org/resources/RTNews/html/rtnews9a.html> [retrieved on Oct. 26, 2009].

Roni Yagel and John Meeker, "Priority-driven Ray Tracing," The Journal of Visualization and Computer Animation, vol. 8, No. 1, pp. 17-32, Jan. 1, 1997.

Martin Christen, "Ray Tracing on GPU," Master's thesis, Univ. of Applied Sciences Basel (FHBB), Jan. 19, 2005 (Available online at http://gpurt.sourceforge.net/DA07_0405_Ray_Tracing_on_GPU-1.0.5.pdf, last visited Dec. 10, 2009).

* cited by examiner

SYNTHETIC ACCELERATION SHAPES FOR USE IN RAY TRACING

CROSS-REFERENCE TO RELATED APPLICATIONS

This application claims priority from U.S. provisional application No. 61/106,255, filed on Oct. 17, 2008, entitled, "Synthetic Acceleration Shapes for Use In Ray Tracing" and from U.S. provisional application No. 61/164,205, filed on Mar. 27, 2009, entitled, "Synthetic Acceleration Shapes for Use In Ray Tracing", both of which are herein incorporated by reference in their entireties, for all purposes.

BACKGROUND

1. Field

The following relates to rendering, using ray tracing, two-dimensional representations of three-dimensional scenes, and more particularly to accelerating intersection testing of rays with acceleration structures.

2. Related Art

Rendering photo-realistic 2-D images from 3-D scene descriptions with ray tracing is well-known in the computer graphics arts. Ray tracing usually involves obtaining a scene description composed of geometric shapes, which describe surfaces of structures in the scene, and can be called primitives. A common primitive shape is a triangle. Objects can be composed of one or more such primitives.

The primitives can be associated with textures and other information that instructs a computer how light hitting that primitive should be affected by qualities of the primitive. In other words, a model of a physical environment is produced; the model may be designed to produce realistic results for conditions familiar to humans, or the model may be designed to achieve other results as desired. Ray tracing can produce such photo-realistic images, including realistic shadow and lighting effects, because ray tracing can model the physical behavior of light interacting with elements of a scene. However, ray tracing is also known to be computationally intensive, and at present, even a state of the art graphics workstation requires a substantial amount of time to render a complicated scene using ray tracing, and real-time high quality and resolution rendering with ray tracing is still difficult to achieve.

A computationally intensive part of completing a rendered 2-D representation of a 3-D scene is determining which rays intersect which primitives (can be called intersection testing). This is because a complex scene can have hundreds of thousands, or even millions of primitives, and many thousands (or more) of rays need to be intersection tested in the scene. Directly testing each ray against each primitive has been found to be computationally more expensive than strategies that introduce an acceleration structure into the 3-D scene, such that the scene is subdivided for intersection testing. Such subdivision provides the effect that a ray can be tested first against the acceleration structure to determine whether the ray possibly can intersect a given primitive or set of primitives because it intersects an element of the acceleration structure bounding the primitive(s). Then, if that ray intersects a bounding acceleration structure, there is a possibility that ray also intersects primitives bounded by it. Intersection testing can then be done to determine whether the ray intersects any of those primitives. An acceleration structure can include several layers of increasingly smaller spatial subdivisions; acceleration structures can be hierarchical.

A wide variety of strategies exist for subdividing a scene with an acceleration structure to aid in intersection testing. A currently popular strategy is called a k-d tree, where k can be an integer number, usually 3 for a 3-D scene. A k-d tree can be formed by repetitively cutting a 3-D scene using a cutting plane for each of the k dimensions. For the common 3-D tree, eight smaller boxes (can be cubes) result from each cutting step. Often, the scene is cut for each ray to an acceptably small volume so that a number of primitives in the volume is small enough to test them for intersection with the ray. Then, the ray can be tested for intersection with any primitives in that volume, and if not, it can be passed to a next volume that the ray would enter. The next volume also can be identified by a series of cutting planes to again identify a small volume in which to test primitives. Then, intersection testing can again be performed.

A k-d tree is an attractive acceleration structure, because the acceleration structure itself is easy to construct and use, and the tree can be represented efficiently in memory. In other words, the cutting plane tests used in the k-d d tree are, relative to other strategies, computationally inexpensive to determine and use in rendering. Also, relatively small amounts of data are required to represent a k-d tree, so that memory requirements to store the data and bandwidth requirements to access the data can compare favorably to other acceleration structures.

A variety of other approaches to using acceleration structures are known in the literature. For example, it has been known to use spheres as shapes to bound primitives. However, further innovation in the area of such acceleration structures remains desirable because such accelerating intersection testing is an aspect than can help achieve increased resolution and frame rates for ray tracing rendering. Also, other qualities can be desirable in acceleration structures, for example, an acceleration structure that may perform well in a static scene may not perform well for accelerating a sequence of images having the same or similar scene objects under dynamic conditions. Therefore, further advancements in acceleration structures are desired.

SUMMARY

Figure 1A:
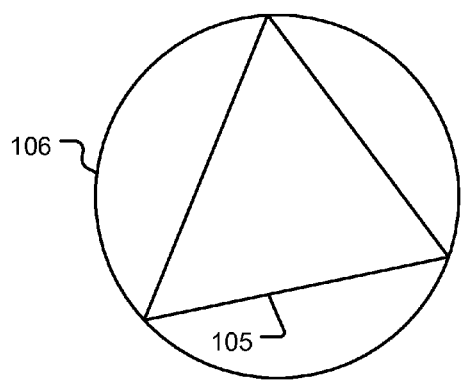
FIG. 1A illustrates bounding of a generally equilateral triangle object with a single spherical acceleration shape.

Acceleration structures are used and selected by a computer to abstract objects composing a 3-D scene to accelerate testing of rays for intersection with the objects. In a first example, the acceleration structures can contain synthetic elements defined by a plurality of spheres, which are fundamental acceleration structures, each of the plurality of spheres is each larger than a minimum required to bound a given object or group of objects. Each sphere of the synthetic element is arranged so that a geometric span of a bounded primitive or primitives is offset with respect to a diameter of that sphere, and also so that each sphere bounds the primitive or primitives.

When testing a ray for intersection with the synthetic element, the ray is tested for intersection with each sphere composing the synthetic element, and the synthetic element is determined to be intersected if the ray intersects all of the spheres composing the synthetic element. If the ray is determined not to intersect any one of the spheres, then the ray need not be further tested for intersection with the object(s) bounded by that synthetic element.

In a second example, a plurality of spheres each smaller than a geometric span for a primitive or primitives to be bounded are relatively arranged by a computer so that each sphere overlaps another sphere, defining a continuous volume bounding the primitive or primitives as a union of the volume defined by the overlapping spheres. During intersection testing, if any of the spheres is determined to be intersected by a ray, then it can be determined to test the bounded primitive or primitives for intersection with that ray.

Further aspects include methods for determining whether to use a single sphere (a "fundamental" element of an acceleration structure, more broadly) to bound an object or a synthetic element, systems for implementing such methods, and computer readable media storing data and instructions for implementing such methods.

Further aspects can include methods for forming an acceleration structure, for example, hierarchical acceleration structures containing synthetic bounding elements. Methods and systems implementing such methods can be controlled and/or configured with parameters appropriate to a given intersection testing architecture or other system. Tradeoffs between available memory for storing an acceleration structure and computational benefit and memory bandwidth savings from using a synthetic element to bound a particular scene object can be configured and/or considered.

In the above aspects, it is generally the case that high aspect ratio primitives or scene objects can be more efficiently bounded with synthetic shapes. Sizes for the shapes comprising a given synthetic element can be selected and spatially arranged to achieve a desired tightness of bounding. What is high aspect ratio can be determined in the context of the particular machines used in performing the intersection testing and the characteristics of other supporting elements, such as memory size and memory bandwidth.

Data structures can be provided that contain interpretation or configuration information controlling how a given set of spheres should be used in constructing a given synthetic shape.

In still further aspects, methods according to the disclosure may comprise providing a computing resource configured for receiving, from a computer readable medium, data defining a 3-D scene, the provided computing resource is further configured to identify, within the data, an object in the 3-D and to instantiate, within a memory, a plurality of spherical acceleration elements for bounding the object in 3-D space. Each of the spherical acceleration elements is instantiated to have a radius larger than a minimum necessary for bounding the object. The computer resource provided is further configured for locating the plurality of acceleration elements by selecting an origin for each of the spherical acceleration elements and storing data indicative of the origin in the memory, such that the geometric span of the object is disposed offset in 3-D space from a respective diameter of each of the acceleration elements, and such that each of the acceleration elements bounds the object in 3-D space; and storing in the memory an indication that positive intersection results between a ray and each of the acceleration elements are required to conclude that the ray may intersect the object. In any of the method examples, further aspects can include providing structure and/or computer readable media elements configured for providing the functions specified.

In further aspects, ray tracing intersection testing methods can comprise receiving computer readable data, in a computing resource, representative of a first point in a scene and of a first radius around the first point. The method also comprises receiving, in the computer resource, data representative of a second point in a scene and determining, using the computing resource, if there is an intersection between the ray and a current sphere defined by the first point as an origin and the first radius a radius for the current sphere. Following determining such an intersection result, the method can vary depending on the shape of the synthetic shape being tested, such as a shape defined by an intersection or a union operation.

For a shape defined by union operation(s), if there is no intersection, then the method comprises determining a next current sphere by locating an origin for the next current sphere along a path defined using the first point and the second point, and repeating the determining, and if there is an intersection, then returning an indication of the intersection to an intersection testing management module.

For a shape defined by intersection operation(s), if there is intersection, then determining a next current sphere by locating an origin for the next current sphere along a path determined based on the first point and the second point, and repeating the determining, and if there is no intersection, then returning an indication of failure to intersect to an intersection testing management module.

The path can be a circle centered on the second point, and the origin of the next current sphere can be determined based on equally distributing a predetermined total number of spheres around the circle. The path can be a line segment connecting the first point and the second point. The path can be a circle defined using the second point as a point about which the second point defines a radius for the circle. Radii of the spheres tested can be determined by interpolating between the first and second radii.

In all of the above examples, the described testing occurs in machines configured for performing the intersection testing between the rays and the spheres. Such machines can comprise intersection testing resources including particular fixed-purpose testing cells, and/or general purpose computers configured with computer readable instructions from a computer readable medium to perform the particular intersection tests described and interpret the results of the tests. Further machine components include communication links for providing the acceleration structures to the testing resources and to receive the results of the testing. The machines for intersection testing can be a component of a larger system including other input and output devices, such as a drive for reading scene description data, and a display or a computer readable medium for outputting rendered scenes. For example, the computer readable medium can be a DVD and each scene may be a frame of a motion picture.

In all of the above examples, the 3-D scene being rendered can represent an abstraction or a model of a real-world scene and the rays being tested also can represent light energy being emitted from lights located in the scene. Similarly, the usage of the camera also can represent a vantage point of an observer for the scene. The output of intersection testing results in determining how light affects the scene and ultimately affects output that can be consumed by other applications, can be stored in computer readable media, and can be displayed to a user.

DETAILED DESCRIPTION

The following description is presented to enable a person of ordinary skill in the art to make and use various aspects of the inventions. Descriptions of specific techniques, implementations and applications are provided only as examples. Various modifications to the examples described herein may be apparent to those skilled in the art, and the general principles defined herein may be applied to other examples and applications without departing from the scope of the invention.

For clarity in description, data for a certain type of object, e.g., a primitive (e.g., coordinates for three vertices of a triangle) usually is described simply as the object itself, rather than referring to the data for the object. For example, when referring to "a ray", it is to be understood that data representative of that ray is referenced, as well as the concept of the ray in the scene.

In this description, the term "intersection" takes on a context-dependent meaning. In one context, the term refers to a concept that a ray can hit ("intersect") a shape (e.g., a primitive) in a scene. In another context, the term refers to the portion of 3-D space defined by the overlap of a set of 3-D bounding volumes (e.g., spheres) disposed in the scene. As explained herein, this portion of 3-D space can be determined by "intersecting" the 3-D shapes of the set.

Many acceleration structures, such as k-d trees or axis aligned bounding boxes, are comprised of simple geometric shapes than can be easily expressed and/or used during ray intersection testing. Although these acceleration structures present such benefits, further opportunities to advance acceleration structures can be realized according to the following.

Spheres can be used as bounding shapes for accelerating intersection testing. For example, spheres can be used in a hierarchy to form a hierarchical tree of spheres used to bound portions of primitives composing a scene.

Spheres have only one face, and can be tested for intersection with a ray reasonably easily. For example, by comparison with a bounding box, where multiple intersection tests for faces of the bounding box are generally required, testing a sphere requires only testing the surface of the sphere for intersection. However, the calculations for testing that one spherical face are more complicated than a simple cutting plane test, which is a component of testing a bounding box for ray intersection.

Spheres also are useful in that they can be translated and rotated without complication, as a sphere can be specified by an origin and a radius, and hence is rotationally invariant. By contrast, a bounding box is often axis-aligned for ease of intersection testing, but an axis-aligned bounding box (AABB) cannot be rotated in the scene (i.e., maintaining the scene axes, while rotating the box), without disrupting the box's alignment (desirable properties of an AABB would be disrupted by such rotation). Similarly, a k-d tree involves subdividing boxes into smaller boxes, where each box represents a volume of scene space, and so elements of a k-d tree generally are not translatable or rotationally invariant.

Although spheres have some desirable properties, they are not always efficient for bounding some types of shapes. For example, a smallest sphere to bound an arbitrary set of points in 3-D space has a radius no greater than $$\frac{\sqrt{6}\,d}{4},$$

where d is the geometric diameter for that set of points. A geometric diameter for a 3-D shape can be considered as the largest distance in 3-D space between any pair of points forming that shape. A geometric diameter for a non-equilateral triangle is its hypotenuse (i.e., the geometric diameter is formed between the two vertices defining the triangle's hypotenuse); a geometric diameter for a rectangle is its diagonal. As evident, some shapes can have more than one set of points forming their respective geometric diameters. For example, a line through arbitrary opposite points on a sphere's surface define that sphere's geometric diameter.

A volume of a sphere is $$v = \frac{4}{3}\pi r^3.$$

So, to bound a triangle or some other object having a geometric diameter of length d with a sphere, the sphere would have a volume $$v = \frac{3\sqrt{3}}{8}\pi \cdot d^3.$$

Therefore, the volume of a sphere for enclosing such a triangle grows as the cube of its hypotenuse. For longer "skinny" triangles or other shapes, much of the volume of such a sphere can be empty space, such that it is inefficient to bound such a triangle with a sphere. Here, "inefficient" includes that even though a ray can be determined to intersect the sphere, the sphere can bound the bounded shape so loosely that such intersection determination is not a good predictor that the bounded shape actually will be intersected by the ray, once the shape is tested.

For example, FIG. 1A illustrates a triangle 105 bounded by a circle 106 (2-D shapes used to illustrate concepts relevant to 3-D space), where the triangle has generally equilateral sides, and it is evident by inspection that circle 106 bounds triangle 105 with reasonable efficiency, and that determining that a ray intersects circle 106 would yield reasonably useful information in determining that the ray also would intersect triangle 105. A best-case scenario for bounding a 2-D triangle in 2-D space with a circle is when bounding an equilateral triangle with a side length of $\sqrt{3}r$, with r as the radius of the bounding circle.

Figure 1B:
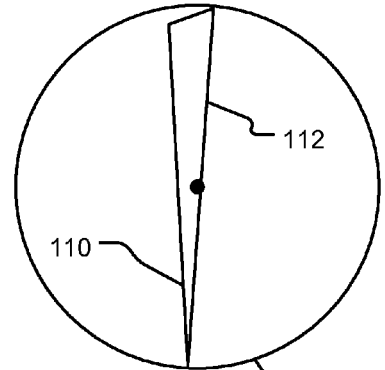
FIG. 1B illustrates bounding of an elongate triangle object with a single spherical acceleration shape.

However, FIG. 1B illustrates a triangle 110 bounded by a circle 111. Circle 111 is for illustrating a smallest diameter circle that can bound triangle 110, because a hypotenuse 112 of triangle 110 (i.e., a longest dimension of triangle 110) is generally through the diameter of circle 111. In other words, FIG. 1B illustrates a smallest circle that can bound triangle 110, and it is evident that a diameter of circle 111 would be generally coextensive with the hypotenuse of triangle 110. More generally, the diameter of circle 111 would be coextensive with a longest dimension of a bounded shape. As evident, circle 111 bounds triangle 110 with lower efficiency than circle 106 bounded triangle 105. Thus, determining that a ray intersected circle 111 would be more likely to yield a "false positive" in that such an intersection determination is less likely to indicate that the ray actually intersects triangle 110.

Nevertheless, it is desirable to be able to use such triangles, because they are used beneficially in meshes for long, thin objects, such as cylinders. Cylindrical type objects found in scenes can include light poles, pipes, straws, stems, and any number of generally elongate objects that can exist in a 3-D scene to be rendered. Elongate thin objects are one example of an object shape that may benefit from bounding according to these disclosures. However, other shapes, such as large, generally flat (planar) shapes, also may bounded by acceleration shapes according to these disclosures.

As introduced above, many of the following examples are illustrated in 2-D space, and by extrapolation the disclosures relating thereto can be extended to 3-D space, and to bounding 3-D or 2-D shapes with spheres.

Figure 2:
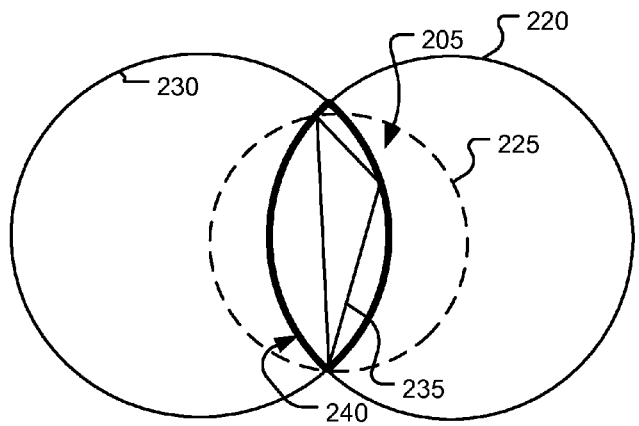
FIG. 2 illustrates a first example of bounding an elongate triangle object with a synthetic acceleration shape formed from an intersection of two spherical shapes.

FIG. 2 illustrates a first example configuration for using multiple bounding shapes (circles in 2-D, spheres in 3-D) to bound an elongate shape (e.g., a triangle). First, a triangle 235 is illustrated as being bound by dashed circle 225, showing a typical bounding arrangement using a single circle. FIG. 2 then illustrates that a set of two circles, comprising circle 230 and circle 220, are arranged in a manner such that their diameters are offset from a longest geometric diameter (hypotenuse) of triangle 235. The circles 230 and 220 define a synthetic shape 240 which bounds triangle 235 and which encloses a smaller area than an area 205 enclosed by circle 225.

When using circles 230 and 220 in an acceleration structure, an intersection testing method or system would determine that both circle 230 and circle 220 were intersected by a given ray in order to determine that the shape 240 defines a space in which an object (such as triangle 235) may be intersected by the ray. More explicitly, such intersection testing requires sphere two intersection tests to determine whether a ray intersected the desired volume of space enclosed, rather than a single test, as would be the case if sphere 225 were used to bound triangle 235. Also, the diameter and area of each of circles 230 and 220 are larger than circle 225, and can be made much larger. In some circumstances, it is preferred to make the circles/spheres much larger so that the volume of space by the spheres is made smaller and can more tightly fit the object(s) to be bounded.

Figure 3:
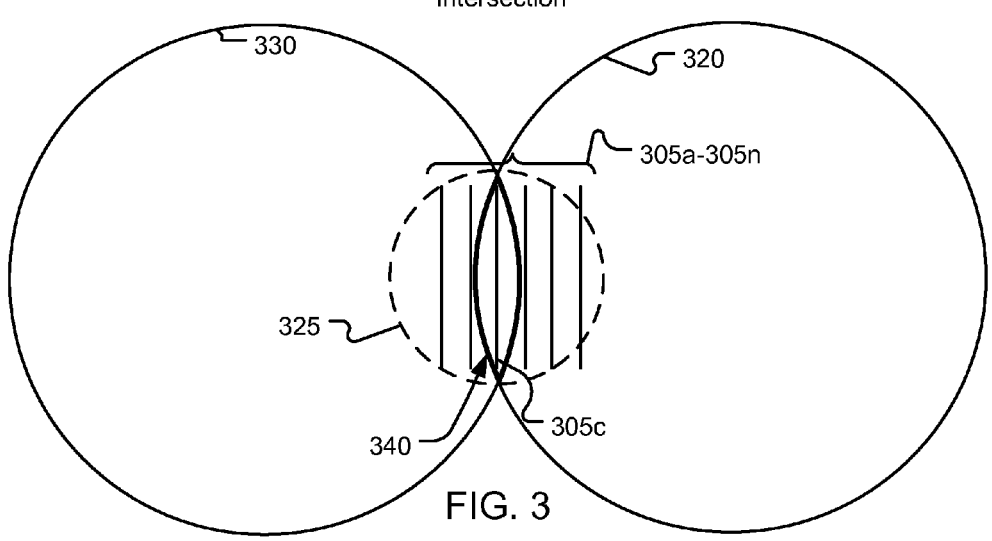
FIG. 3 illustrates a second example of bounding an elongate triangle object with a synthetic acceleration shape.

FIG. 3 illustrates a further example where the benefits of using a plurality of spheres to bound a scene object are apparent (consider FIG. 3 a projection onto a 2-D page from a 3-D scene). FIG. 3 illustrates a sequence of high aspect ratio cylinders 305a-305n, which could be a portion of a fence in a scene, for example. Each fence post can be formed of a mesh of triangles, which may include thousands of such triangles. Using a single sphere 325 to bound one of the posts, 305c, causes a plurality of nearby posts to be included in the volume of the sphere that bounds post 305c, because the sphere diameter must accommodate the longest post dimension. It may thus be necessary to test many triangles for intersection if it is determined that the sphere is intersected by a ray. A better bounding volume would be desirable.

By arraying a number of offset spheres, here, the example is that two spheres 330 and 320, each having a diameter larger than the longest dimension of the fence post, a tighter synthetic bounding shape 340 can be created. A plurality of intersection tests are required to determine that shape 305c is bounded by shape 340. Beneficially, however, a large number of primitives are excluded from a volume defined by shape 340. Thus, although a plurality of intersection tests are required to determine a ray intersection with the synthetic shape 340, the usage potentially avoids many thousands of intersection tests between that ray and primitives that would have been bounded by a single bounding sphere.

Notably, each of spheres 330 and 320 could individually contain a very large number of other scene objects, since each is much larger than sphere 325. However, by requiring separate intersection tests for both sphere 330 and 320 to be positive to determine that synthetic shape 340 is intersected, the combination of much larger volume spheres can be made to bound more tightly an elongate shape. Also notable is that the larger each sphere is made, the more tightly the space defined by the intersection between the spheres can be made to bound such an elongate object.

Also, since the intersection of spheres 330 and 320 define a volume, the shape bounded in the intersection between the elements can be planar, for example, a wall composed of a plurality of elongate triangular primitives can be bounded by synthetic element 340 composed of spheres 330 and 320.

Figure 4A:
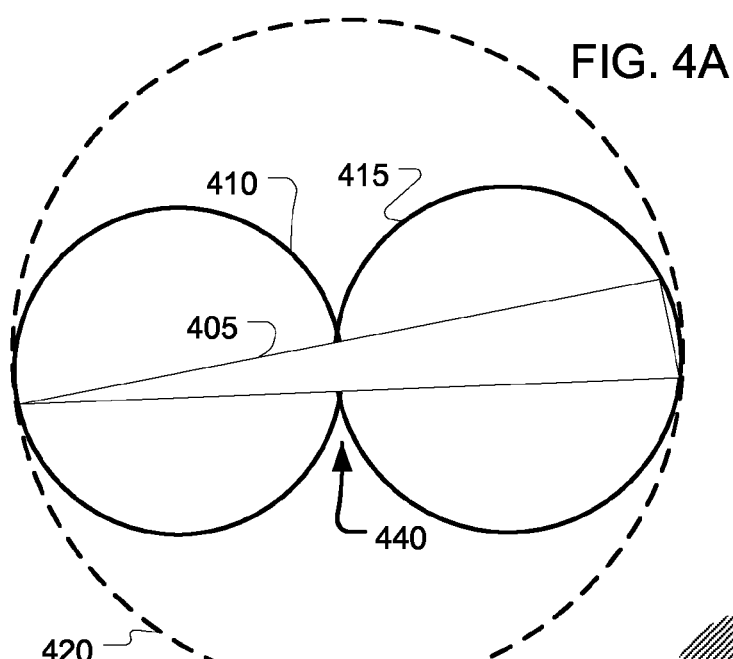
FIG. 4A illustrates an example of bounding an elongate object with a synthetic acceleration shape formed from a union of two spherical shapes.

FIG. 4A illustrates another example where a synthetic bounding shape comprising the union of the interior of distinct spheres 410 and 415 can be used to bound an elongate shape 405. FIG. 4A illustrates that for a single sphere 420 to bound shape 405, it must be larger in volume than the combination of the volumes of spheres 410 and 415. To determine that a ray intersected the synthetic shape defined by the union of 410 and 415, illustrated with shading and on a smaller scale in FIG. 4B, both sphere 410 and sphere 415 must be tested. One consideration in using a synthetic shape in accordance with FIG. 4A is that spheres used to define the synthetic shape should overlap to an extent required to provide a continuous volume that bounds the relevant scene object, as illustrated by arrow 440 generally pointing to a region of overlap that defines a continuous volume enveloping shape 405. In the example approach of FIG. 4A, an intersection between the synthetic bounding shape and a ray is identified by determining that the ray intersects either one or the other of the spheres 410 and 415. Thus, in some approaches, if one of spheres 410 or 415 is tested first, and found to be intersected, then shape 405 may then be tested for intersection with the ray, without also testing sphere 415.

Figure 4B:
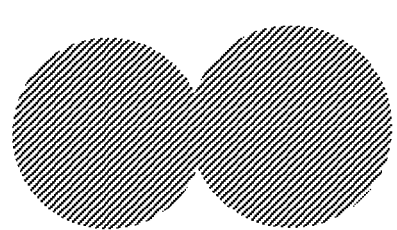
FIG. 4B illustrates a 2-D projection of the volume defined by the synthetic acceleration shape illustrated in FIG. 4A.

FIGS. 3 and 4A-4B illustrate examples of defining synthetic bounding shapes from a plurality of distinct spheres. Although it was illustrated that two spheres can be used to form a synthetic shape in these examples, it would be understood that these examples can be extended to include more spheres, as demonstrated in the following examples.

Figure 4C:
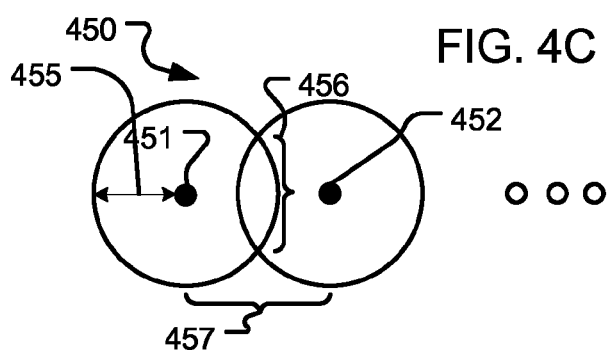
FIG. 4C illustrates an example of a parametrically definable synthetic shape.
Figure 4C:
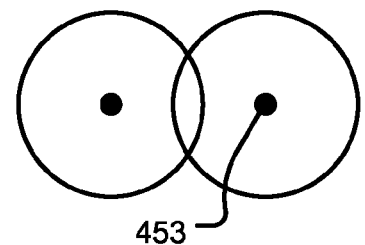

FIG. 4C illustrates in cross section a synthetic element 450 that can be formed with union operations. FIG. 4C illustrates a first sphere identified by its origin 451 overlapping a second sphere identified by its origin 452. These spheres are offset from each other a distance 457 in one direction, and an amount of overlap between the spheres in a direction perpendicular to the one direction is identified as 456. A radius of the first sphere is 455. As can be discerned, an elongate element can be bounded within the spheres, so long as its cross-sectional area fits within the area identified in one direction as 456 (overlap 456 can also be viewed as a diameter of a circular cross-section defined by the sphere overlap). The interval 457 between the spheres can be specified based on an element to be bounded or can be fixed to bound a variety of expected shape sizes. Although a fixed overlap or overlap to radius ratio may cause looser bounding of some shapes, it allows a more compact data representation. For example, an end sphere origin 453 can be defined, although with the start sphere origin 451 and radius 455. Based on a selectable or fixed ratio of radius to overlap, each subsequent sphere can be placed without additional data, until the end sphere has been reached, thus defining a volume by the sphere sequence.

Optionally, a radius of the end sphere can be specified as well. In such a case, radii of the spheres may be interpolated from the radius of the start sphere to that of the end sphere.

Each sphere in the sequence can be tested for intersection, potentially serially against one or more rays, and when an intersection has been identified, then no further testing of the sequence need by undertaken, as the operation is a union operation (e.g., by contrast with the intersection operation of FIG. 3).

Figure 5A:
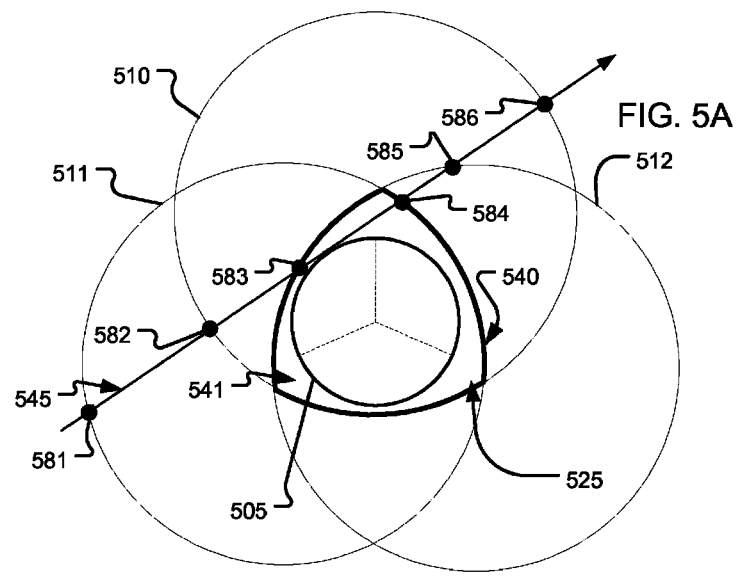
FIG. 5A illustrate a top view of an example of bounding a generally cylindrical object with a synthetic bounding element formed of three spheres.

FIG. 5A depicts a top view of cross section of an example using three spheres 510, 511, and 512 bounding a cylindrical object 505. The cross section illustrated is identified as cross section 506 in the side view of FIG. 5B. Returning to FIG. 5A, spheres 510, 511, and 512 are arranged so that their respective centers are offset from a center of the cylinder. Also, in a particular example, each sphere center can generally be considered to be dispersed at 120 degree angles in a plane around the cylinder. Stated differently, if lines were drawn to connect the sphere centers, the lines would form a generally equilateral triangle in this example. Generally, the larger each sphere is made, the more closely the synthetic shape 540 can bound the cylinder with a volume 541 (illustrated in cross-section) defined by synthetic shape 540. Also, this example shows three spheres bounding the cylinder. Such an implementation causes the cross section of synthetic shape 540 illustrated to have a certain degree of protrusion from the generally circular cylindrical object, as illustrated in the region identified as 525. Using more spheres to define the synthetic shape would reduce the amount of protrusion. For example, if four spheres were used, they can be arranged at 90 degree angle increments to each other, and would soften this protrusion. The selection of a number of spheres to use can depend on scene-specific information, such as what objects surround the object being bounded. The selection of spheres also can depend on system-specific information, such as a goal to use less than a certain amount of memory on an acceleration structure, or on the processor architecture being used. For example, if a SIMD architecture can test four spheres at a time for intersection with a ray, then using four spheres instead of three may pose little additional processing overhead, and so acceleration structure creation for such a processor can be configured to use four spheres.

Figure 5B:
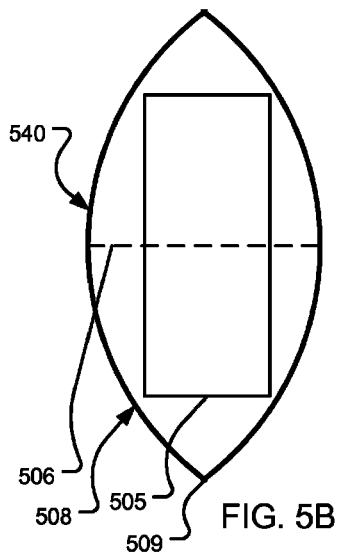
FIG. 5B illustrates a side view of the example of FIG. 5A.

FIG. 5B illustrates a conceptual side view of how synthetic shape 540 bounds cylinder 505. As described above, cross section 506 is the view illustrated in FIG. 5A. It should be apparent from FIG. 5B that the spheres are to be constructed at least large enough so that each bounds cylinder 505. Also, the area generally indicated at 508 shows that the cross section of synthetic element 540 shrinks at each end to a point 509. The cross section in the area 508 can be made somewhat larger by using more spheres, such that the convergence to point 509 is softer and more tangential to a bottom surface of cylinder 505.

The synthetic element 540 and those according to this example can be specified advantageously using data elements from only two spheres. Data elements in two spheres comprise two vectors used to specify each origin and two numbers used to specify each radius. In one example usage, one origin can specify a center point for all constituent spheres of the synthetic element, and the second origin can specify an offset from the center point at which all origins of all constituent spheres will be located. A first radius value can be used to specify the radii of all constituent spheres, and the last radius value can specify how many constituent spheres will compose that synthetic element. The spheres preferably would be distributed equally around the circle defined by the orbit of one origin around the other. Other arrangements or usages of the spherical data can be provided. Further, data from more than two spheres can be used in other implementations. The circle defined by the two origins preferably would be proximate a middle point of a long dimension of the high aspect ratio primitive or shape. Of course, the spheres can be offset from that point, but in such cases, the constituent spheres may need to be larger than at the middle point (see 506 in FIG. 5B).

More generally, these examples show preferred arrangements of constituent elements, and other arrangements of such elements can be provided. Such arrangements can provide advantages over single spherical bounding elements, even if those arrangements may be less optimal or no more optimal than the examples described herein.

FIG. 5A is also used to illustrate an optimization useful when intersection testing using synthetic bounding shapes. A ray 545 is traversing the scene, such that it intersects each of spheres 510, 511 and 512 in two places. The first intersection point 581 between ray 545 and sphere 511 occurs relatively far from the bounded object, shown bounded by synthetic element 540, while the second intersection point 584 occurs on the surface of synthetic shape 540. Similarly, ray 545 intersects sphere 510 at points 582 and 586, and ray 545 intersects sphere 512 at points 583 and 585.

Thus, the points between the respective ray/sphere intersections each define an interval. To determine whether the synthetic shape 540 is intersected, the interval over which ray 545 travels within each sphere tested for intersection with each other interval for the other constituent spheres of synthetic shape 540. If there is overlap between all the intervals (i.e., if there is a non-zero intersection), then ray 545 can be determined to intersect synthetic shape 540.

Figure 6:
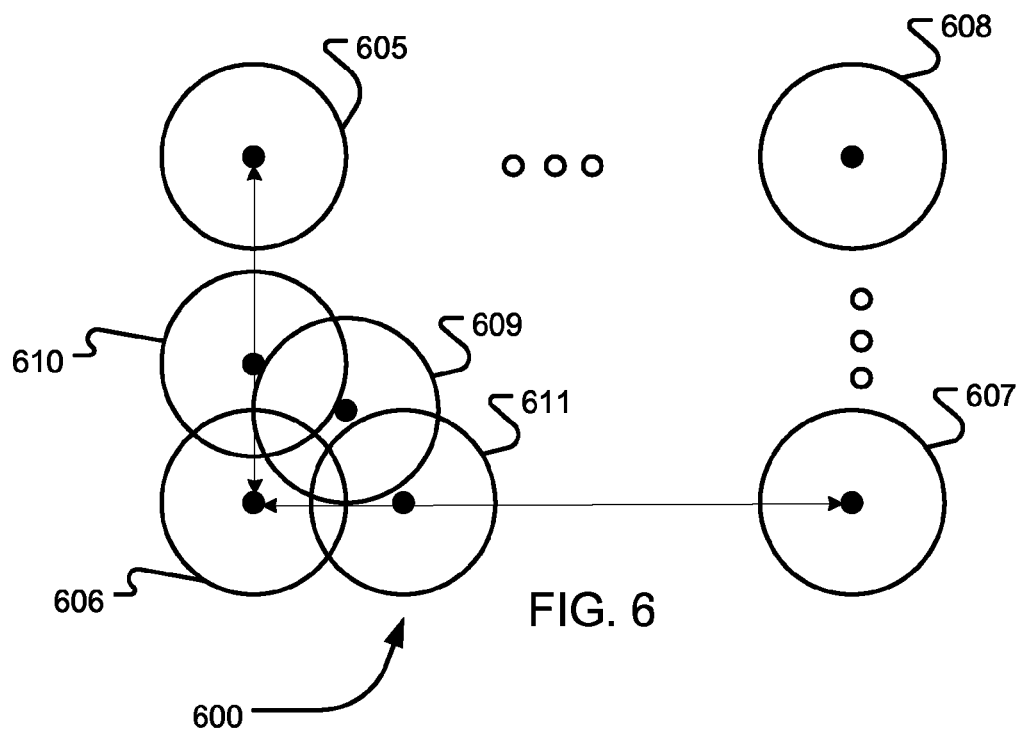
FIG. 6 illustrates an example of another parametrically definable synthetic shape.

FIG. 6 illustrates another example of how a synthetic shape composed of a number of spherical elements can be used to bound an scene object or primitive that has a high aspect ratio in one or more dimensions. In particular, FIG. 6 illustrates an example construction 600 where a generally planar surface patch can be bounded by a series of smaller spherical elements arranged in space to create a continuous volume defined by a logical OR operation. The construction 600 comprises corner spheres 605, 606, 607, and 608. For each corner sphere, a dot depicts its origin, and a circular portion depicts a radius defined for the sphere. Thus, the corner spheres' origins define an extent of the planar patch. Intermediate spheres with origins at points intermediate to the corner origins arranged in an overlapping fashion then complete the synthetic shape. Spheres 608 and 607 are illustrated, and it would be understood that other spheres would be provided in similar overlapping fashion.

Preferably, the actual origin of each such sphere is not individually specified by separate origin data. Instead, the entire synthetic element can be specified with reduced data by allowing some attributes of each sphere to be in common with the other spheres. For example, the spheres all can be the same radius. For example, a data structure that would completely specify a single sphere would generally include fields for an origin and a radius—typically floating point values. However, construction 600, with a variable, and potentially very large number of spheres, can be specified using data found in 3 spheres. For example, the floating point origin and radius values in 2 of the 3 spheres can be used to specify the origins of all four corner spheres (or more generally, any 4 of the 6 values available can be allocated to origins). Then, the origin value for the third sphere can be used to specify the radius of all the spheres, and the radius value for the third sphere can be used to specify an offset distance value to specify a distance that each sphere origin would be offset from the other.

Alternatively, a radius specified for the spheres can imply an offset value, based on a preset ratio of radius to offset (e.g., it can be preset that each next sphere origin is offset 75% from the previous in each dimension). In this scenario, the last floating point value of the third sphere can specify a different radius, such that the radii of the spheres can interpolate from one end of the planar patch to the other.

Figure 7:
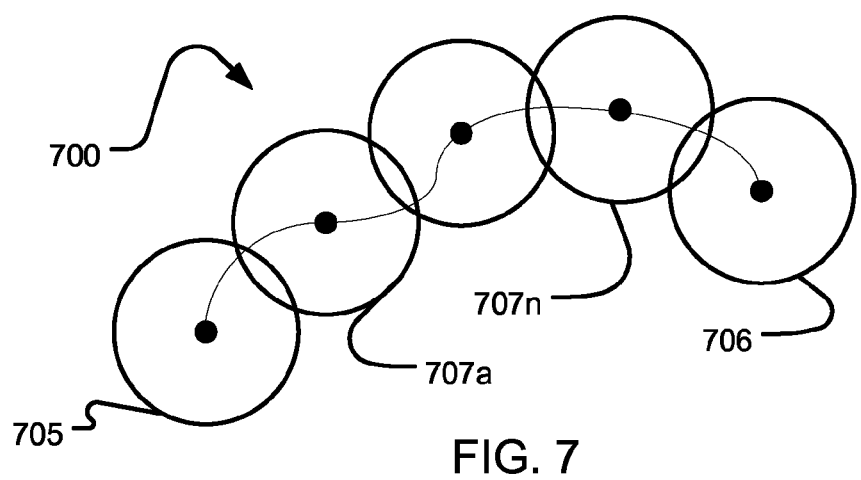
FIG. 7 also illustrates an example of another parametrically definable synthetic shape.

FIG. 7 illustrates a further example construction 700 in which a curve 702 with control points can serve as a guide for a plurality of overlapping spheres defining a synthetic element. In this example, a parametric expression can be provided for the curve, and then sphere origins can be placed at intervals along the curve 702. Thus, in this situation, a curve may be defined by an equation, and then a start point, an end point, and an interval can be specified. For example, curve 702 can be selected from a catalog of curves, and then two spheres (e.g., spheres 705 and 706), with a total of four floating point values can specify a start, an end, and an interval, with one floating point value remaining. Spheres placed according to the interval are exemplified by spheres 707a and 707n. In example 700, the spheres define a bounding volume constructed as a Boolean OR, such that detecting intersection of any single sphere composing the synthetic element is sufficient to determine that the synthetic element was intersected. Consequently, the next step of intersection testing can occur immediately thereafter, as will be discussed below.

It would be apparent from the above examples that any of a variety of synthetic bounding shapes can be constructed by following such examples. With these prototypical examples, examples of systems, software, and data structures are provided below to illustrate how these examples can be implemented in constructing acceleration structures, and in accelerating intersection testing.

Figure 8:
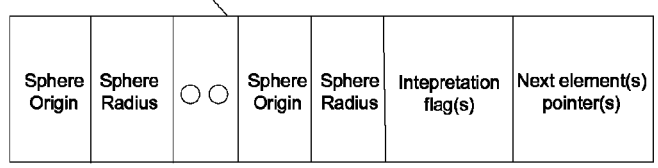
FIG. 8 illustrates a first example data structure that can be used in expressing synthetic acceleration shapes.

FIG. 8 illustrates a first example data structure 875 that can store definitions for a plurality of spheres to be used in a synthetic bounding element of an acceleration structure. Data structure 875 includes two or more sets of sphere origins and radii, and an interpretation flag or flags. The interpretation flag can be used to determine how the spheres should be used in defining the synthetic element, and in a particular example, whether the synthetic element should follow the example of FIG. 3 or the example of FIG. 4A. Data structure 875 also can include a pointer to one or more acceleration elements to be tested next (can be a list or a predetermined number of elements, for example), if it is determined that the results of testing the synthetic element for a given ray are positive. If the results were negative for a given ray, then that ray would not need to be further tested, in a typical hierarchical acceleration structure.

Figure 9:
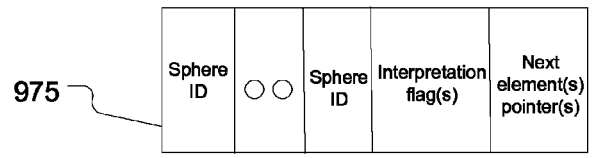
FIG. 9 illustrates a second example data structure that can be used in expressing synthetic acceleration shapes.

FIG. 9 illustrates another example data structure 975, which instead of directly specifying sphere origins and directions, can reference spheres using a sphere ID, which can be an offset from a location in a memory where sphere IDs are stored, or can be a hash value, or another means for using the ID as an index to obtain an origin and radius for the identified spheres. Both data structure 875 and data structure 975 illustrate that an arbitrary number of spheres can be used to specify a given synthetic element.

Data structures 875 and 975 provide examples of data structures that provide configurability or adaptability in how the identified or specified spheres are used in constructing a given synthetic element. As would be apparent from the above description, synthetic bounding elements can be defined by a number of constituent spheres. The constituent spheres need not all be explicitly defined, but rather can be programmatically constructed. As such, there is no particular requirement that the data used in that programmatical construction be explicitly identified as origin and direction data. Rather, any data format providing the ability to specify 3-D points to locate the extent of a synthetic shape (e.g., ends of a line, or corners of a planar patch, and so on), with any other data required for the express or implied interval and radius information described above).

In many cases, the synthetic elements will be used in a hierarchical tree of acceleration elements. In such cases, acceleration elements lower in the hierarchy can inherit properties from acceleration element(s) higher in the hierarchy. As will be explained further below, some elements in a given hierarchy can be single spheres (i.e., not synthetic elements), while others can be synthetic, in that they are composed of two or more spheres and treated for intersection according to intersection or union operations.

Figure 10:
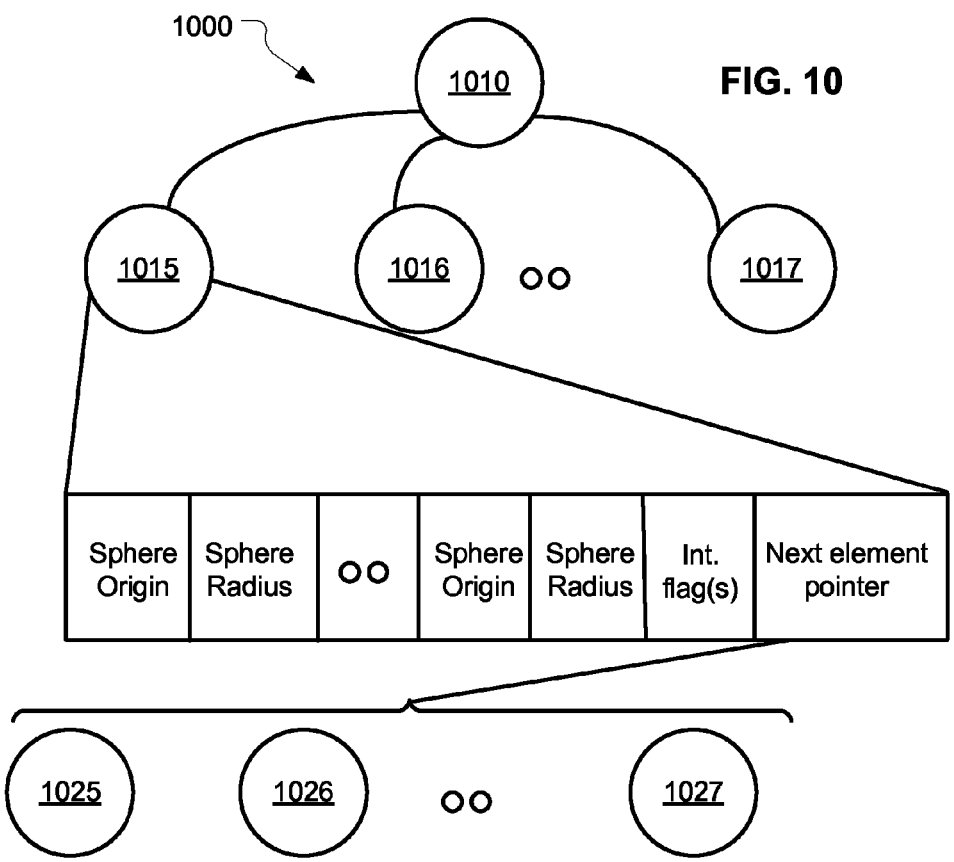
FIG. 10 illustrates an example tree structure of acceleration elements that may comprise synthetic acceleration shapes according to these disclosures.

An example of a small portion of a hierarchy 1000 of acceleration elements is shown in FIG. 10. Hierarchy 1000 includes a node 1010, which represents either a sphere or synthetic acceleration element. Node 1010 references a plurality of child nodes 1015 through 1017; the plurality of child nodes can vary among implementations, and can be selected based on testing capabilities of the implementation, for example. Each child node 1015 through 1017 can represent either a sphere or a synthetic element. For example, node 1015 is shown as representing a synthetic element with a data structure according to data structure 775. In turn, the next element pointer of the data structure for node 1015 references a set of further nodes 1025 through 1027, each of which also can represent a sphere or a synthetic element. Hierarchy 1000 could be used for bounding, in an example, a house with node 1010, while each of nodes 1015-1017 could be synthetic elements bounding walls of the house, while respective child nodes of nodes 1015-1017 (nodes 1025-1027 illustrated) could represent bounding elements for bars in a window of the wall.

In an example implementation, nodes in a hierarchy may each represent a single sphere, and an interpretation flag may be included for each element. Each element may be interpreted according to a default interpretation unless otherwise indicated by an interpretation flag. For example, a string of elements may each be interpreted according to the intersection example of FIG. 3, unless indicated otherwise. In still further implementations, a synthetic element may be composed of a combination of intersection (FIG. 3) and union (FIG. 4A) operations.

One notable aspect of hierarchy 1000 is that typically spheres in a sphere hierarchy tend to become smaller as the hierarchy is traversed towards leaf nodes. Here, however, the hierarchy may include parent nodes (e.g., node 1010) that can be formed of a single sphere, while that parent node can have a node for a synthetic bounding element comprising a plurality of spheres much larger than the parent node sphere. However, the spheres are tested such that the bounding shape can be considered as an intersection or a union of the spheres identified with respect to that hierarchy node, resulting in a bounding shape and a bounding volume unattainable by use of only a single sphere or any single instance of another simple polygon.

In many implementations, a renderer accepts scene data from an application, and prepares the scene data to be rendered in a workflow that can ultimately result in a rendering of one or more frames (or one or more rendering passes) of the scene.

Figure 11:
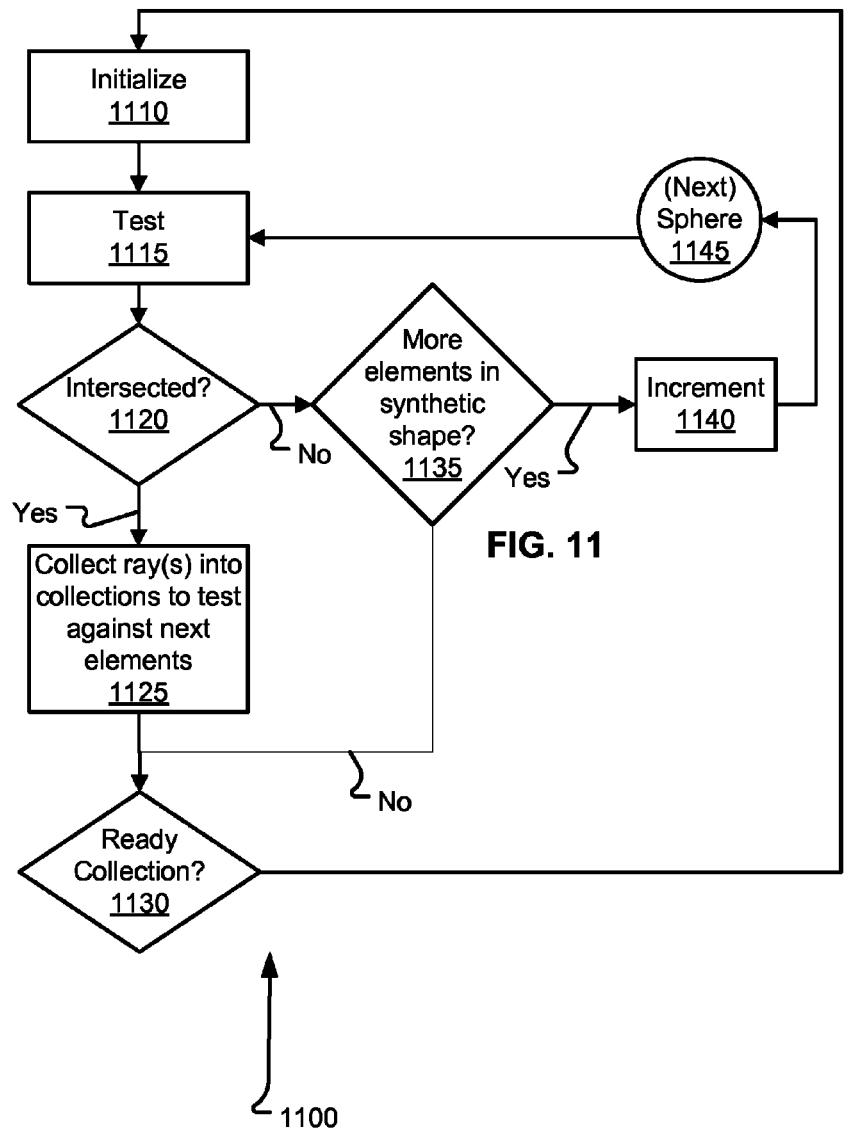
FIG. 11 illustrates an example workflow for producing an acceleration structure during preparation to render a scene.

FIG. 11 illustrates an example method 1100 of intersection testing in which synthetic union shapes can be used. A ray(s) can be initialized for testing against an identified synthetic shape 1145, which is provided to an intersection testing resource with the ray(s). That sphere 1145 is tested, and if the ray is found to intersect, the synthetic shape can be found immediately to intersect that synthetic element, and preferably, that ray is added 1125 to a collection to be tested for intersection against a next acceleration element (either synthetic or primary, identified by the synthetic element).

If the sphere 1145 was not intersected, then it can be determined 1135 whether there are more elements in the synthetic shape. If so, then an incrementing or indexing 1140 can occur, such that a next sphere is provided for test. For example, the next sphere can be parametrically, algorithmically or expressly defined. Testing 1115 and those steps following it are repeated.

If there were no further elements (determination 1135), or if there was an intersection detected, step 1130 provides a step of determining whether there is another ray collection ready for testing against a shape, a group of shapes, or a synthetic shape. If so, then initialization 1110 occurs for that testing, and if not, then this example method can terminate (even though in most implementations, further processing unrelated to this example can occur).

In this example, when an intersection is found, testing of further elements in the synthetic element can be avoided.

Figure 12:
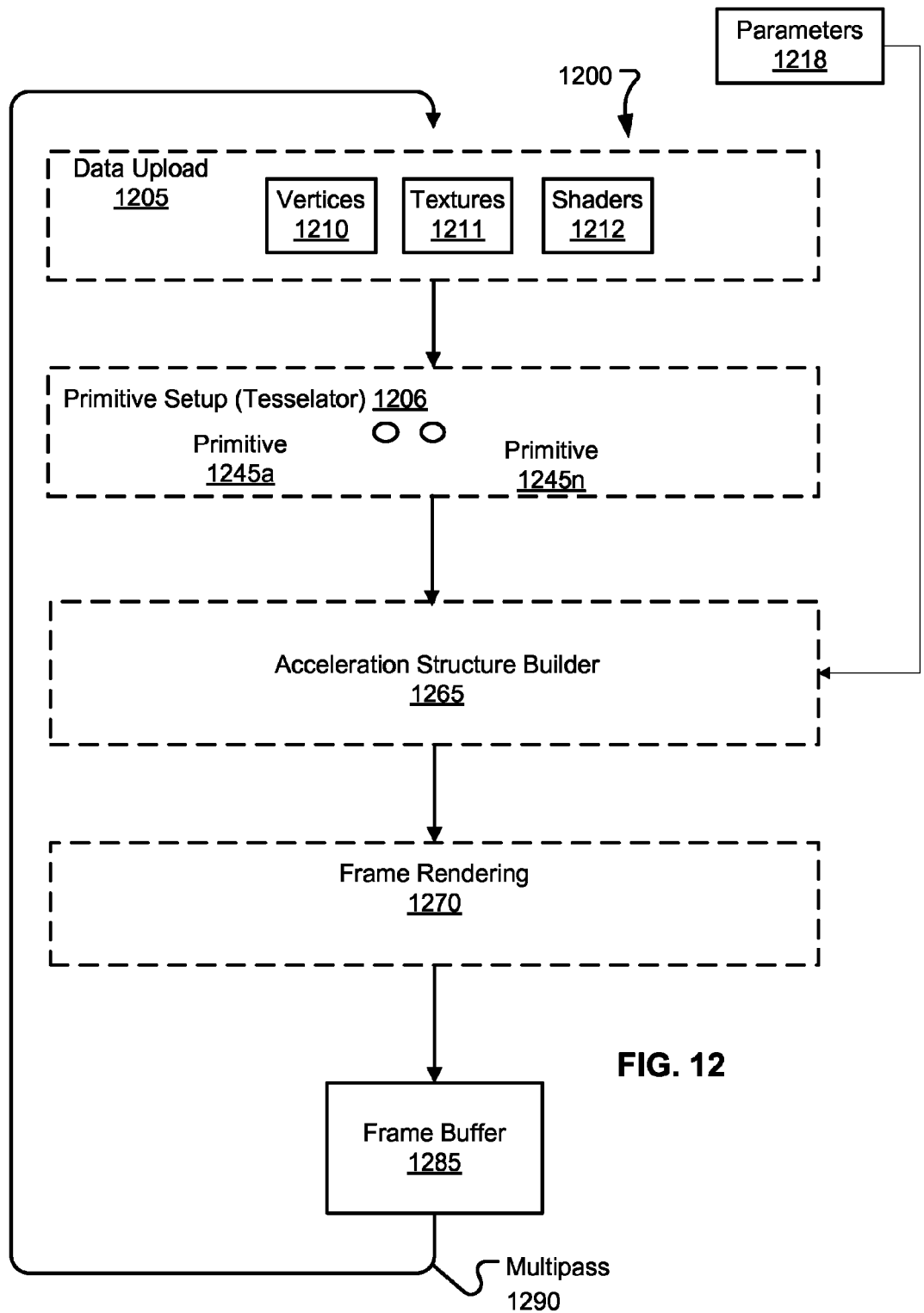
FIG. 12 illustrates an example system that can be used in implementing the aspects disclosed herein.

FIG. 12 illustrates an example workflow 1200, wherein an application can upload vertices 1210, textures 1211, and shaders 1212 to be used in rendering a scene. In a primitive setup phase, workflow 1200 can construct primitives, e.g., triangular primitives 1245a-1245n from vertices 1210, and can bind textures and shaders to the constructed primitives. After the primitive setup phase, the scene is described by a wireframe defined by the created primitives, the textures and the shaders. Then, an acceleration structure builder 1265 can analyze the primitives to determine a hierarchy of acceleration elements that will be used during intersection testing of rays in the scene. Acceleration structure builder 1265 can input parameters 1218 that can influence the construction of the acceleration structure, as described below.

After the acceleration structure is completed, then a frame of the scene can be rendered in frame rendering 1270. Frame rendering would include testing specified rays for intersection in the scene. During such testing, the acceleration structure created by builder 1265 would be used to narrow a number of primitives needing to be tested for intersection with a given ray or group of rays. Results from the rendering can be stored in frame buffer 1285, and a further rendering pass can be done with multipass loopback 1290. Thus, acceleration structure builder 1265 can be included in a flow to prepare a scene to be rendered.

Figure 13:
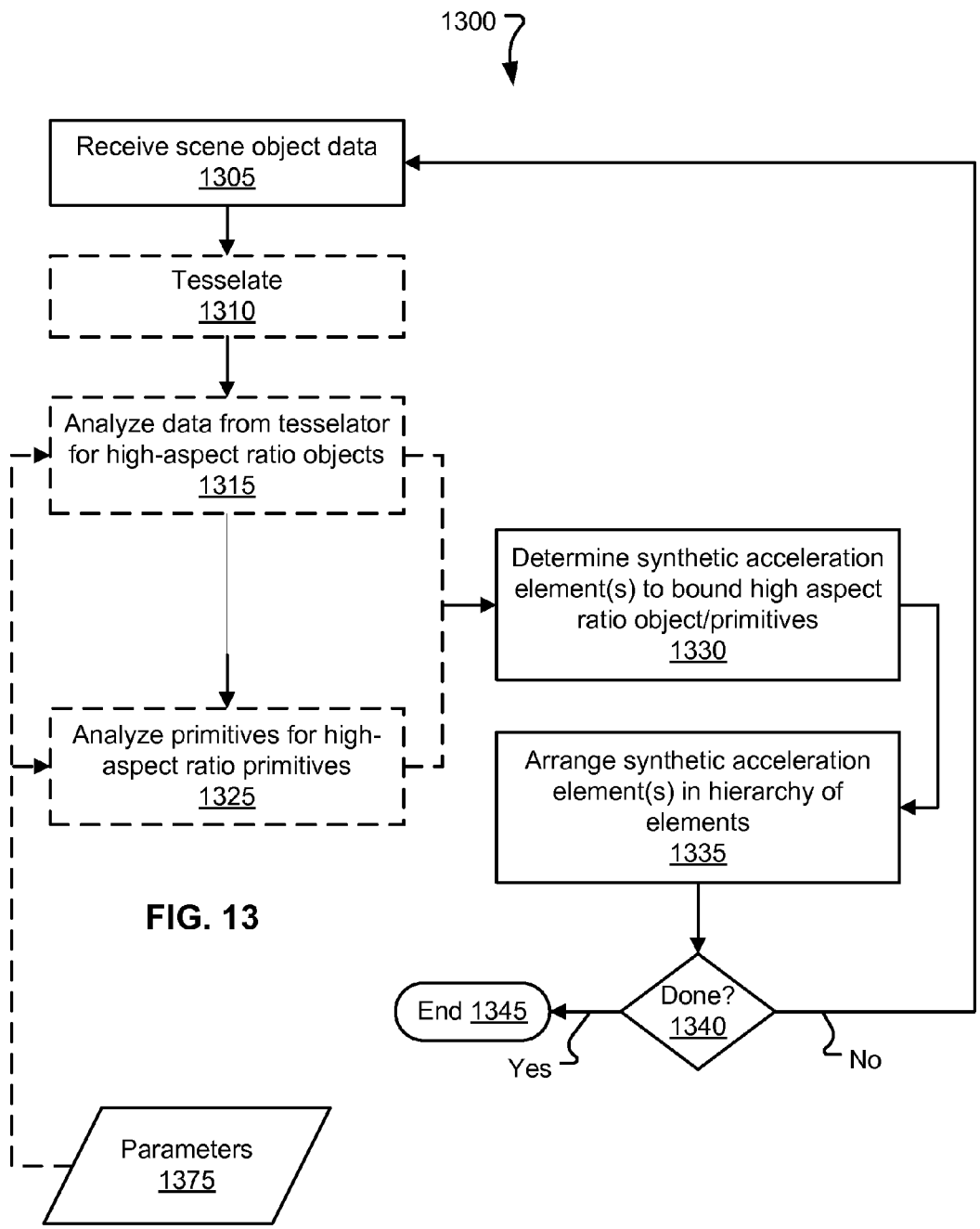
FIG. 13 illustrates an example method that can be implemented in the workflow of FIG. 12 or elsewhere, to determine whether to use a synthetic bounding element or a single bounding element for a given scene object or group of objects.
Figure 14:
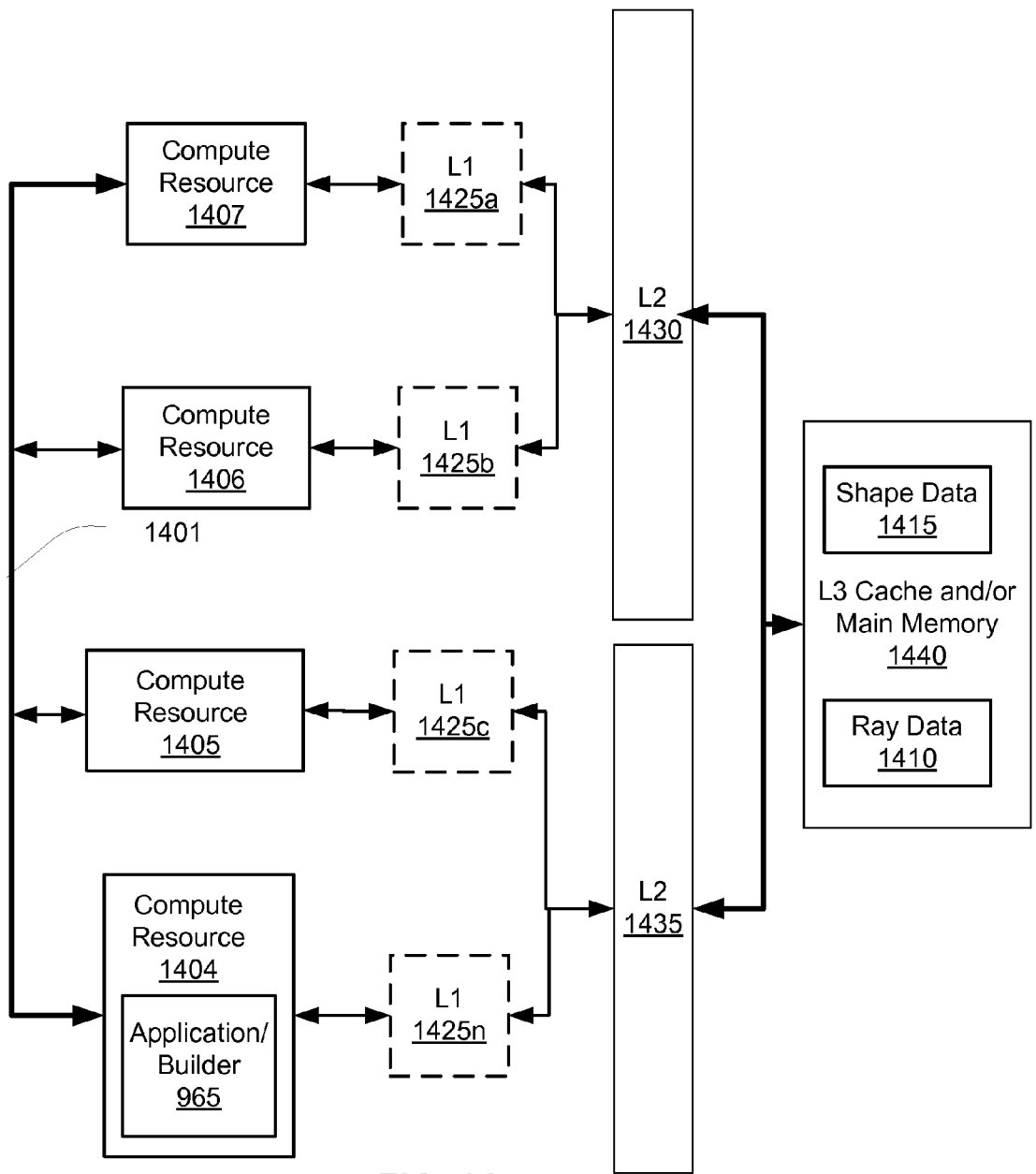
FIG. 14 illustrates an example computing system in which synthetic element intersection testing can be implemented.

FIG. 13 illustrates an example method 1300 that can be performed in building a hierarchy comprising synthetic acceleration elements. FIG. 13 illustrates that the method may implement several optional variations alternatively or additionally, in the context of operations that may occur during preparation of scene geometry for scene rendering. In step 1305, scene object data can be received (workflow step 1205). In some examples, this data can be vertices for a cage that will be tessellated during scene setup into many more triangle vertices. Other higher order surfaces or scene object specifications can be implemented.

Method 1300 may comprise a step of tessellating 1310 scene object data. For example, the tessellation can implement varying amounts of tessellation based on level of detail directives.

The tesselator would then output vertexes specifying primitives (e.g., triangle strips). The tesselator also can output information gathered, available to, or otherwise more easily generated during tessellation, which can help generate the acceleration structure hierarchy comprising synthetic bounding elements according to disclosed examples. For example, during tessellation, information about an aspect ratio of a primitive or group of primitives can be determined, and that primitive can be flagged as potential primitive(s) to bound with a synthetic element.

In another example, a geometry unit can be programmed to tessellate and/or to perform creation of the synthetic bounding elements and arrange them in a hierarchy. As such, a geometry unit unit programmed to both tessellate and produced synthetic bounding elements can use information generated in tessellation to produce the synthetic bounding elements.

Step 1315 includes analyzing object data to identify an object with a high-aspect ratio in one or more dimensions. For example, a long cylinder has a length that has a high ratio to its radius, while a thin box has a high ratio of length and width to thickness. The term elongate thus indicates that an object identified as such can be considered high aspect ratio in the context in which the object is discussed. Such objects are candidates for bounding with synthetic elements. A high ratio can be dependent on the circumstances of any given case, but examples of high ratios can include ratios over or about 2:1, 3:1, 4:1, and so on. Greater benefits can be realized as ratios between a longest dimension and shorter dimensions of a given shape or primitive become greater, and for example much larger aspect ratios of 20:1, 30:1, 50:1, 100:1, or 200:1 or more may be used as a threshold for determining high or comparative high aspect ratio. The threshold can be changed dynamically or responsively to characteristics of the scene being processed. Notably, if no dimension is relatively high aspect ratio compared to any other dimension of an object, then that object is a good candidate to be bound with a single spherical element.

In the absence of information available about higher order surfaces, or information available during tessellation, synthetic bounding elements can be constructed based on primitives generated during tessellation 1310 (or in the absence of tessellation, based on received scene object data, which can include vertexes).

As such, step 1325 allows for primitive analysis (either primitives generated by tessellation or from object data). The analysis of the high-aspect ratio objects or primitives can proceed with parameter data 1375. Such data can include parameters or other configuration information to be used for directing the hierarchy builder. Such parameters can include metrics and/or directives for determining when to use synthetic elements in bounding a given scene object. For example, bounding efficiency metrics can provide cutoff points as to when a synthetic element should be used, and/or how many shapes should be used in a given synthetic shape.

At step 1330, a synthetic element bounding one or more objects or primitives is determined and arranged 1335 in a graph (or more particularly, a hierarchy) of bounding elements, some of which can be simple shapes, and others synthetic elements. At step 1340, it can be determined whether more scene data needs to be analyzed, and if done is false, then the method can return to step 1305, and if not, in this example, the method can end 1345.

Considerations that can be taken into account include how many other objects (e.g., primitives) are bounded incidentally when using a single bounding element, or a synthetic element with a given number of spheres. For example, if few other objects are bounded incidentally by a single element when bounding an isolated scene object, then a single bounding sphere may be used, even though the object may meet other aspect ratio criteria. By further example, further spheres may be added to a synthetic element until an acceptably small number of other objects are incidentally bounded.

Because synthetic elements can use more spheres than simple bounding spheres, a tradeoff in memory storage and computational complexity also can be made when deciding whether to use a synthetic element for bounding a particular scene object. In the above discussion, references to bounding a scene object also can include bounding groups of scene objects, subsets of other bounded groups and so on.

The disclosures above generally illustrate one triangle or shape that may be bounded by a synthetic shape comprising a plurality of spheres. However, it is to be understood that in many implementations a sphere will bound a collection of shapes forming an object, and in some cases, other spheres or other synthetic shapes may bound subsets of the primitives forming that object, and so on.

Any of the functions, features, and other logic described herein can be implemented with a variety of computing resources. A computing resource can be a thread, a core, a processor, a fixed function processing element, and the like. Also, other functions which are not primarily the focus of the present invention, can be provided or implemented as a process, thread or task that can be localized to one computing resource or distributed among a plurality of computing resources (e.g., a plurality of threads distributed among a plurality of physical compute resources).

Likewise, computing resources being used for intersection test can also host other processes, such as shading processes that are used to shade intersections detected. By further example, if a core can support multiple threads, then a thread can be dedicated to shading while another thread can be dedicated to intersection processing.

As discussed above, the described examples can be used in transforming a 3-D scene into a 2-D representation of it, as viewed from a defined vantage point. The 3-D scene can include data representations of physical objects. Other results of ray intersection testing can include object visibility determinations, which can be used in a variety of applications. Other transformations include transforming computer readable media into a different state by storing data determined according to the defined methods.

The above workflow and method examples in preparation for rendering and the rendering itself can be performed in a system 1400 that may comprise a plurality of computing resources 1404-1407. Computing resources 1404-1407 may comprise any one or more of a plurality of processing cores, processors, that can each comprise fixed function and/or programmable elements. The computing resources 1404-1407 may also comprise different threads of computation on a multi-threaded processor, for example. Each of computing resource 1404-1407 may have read and write access to a respective L1 cache 1425a-1425n, that can be integrated with its computation resource or separate. A plurality of L2 caches, e.g., L2 cache 1430 and L2 cache 1435, can be provided and can be shared among the computation resources or private. A shared L3 cache and/or a main working memory 1440 can be provided. In this example, ray data 1410 and shape data 1415 can be stored in L3/main memory 1440. The example system 1400 can execute one or more applications and the scene builder workflow, e.g., application/builder 865. The computation resources can communicate with each other over a shared bus 1401, or using point to point connections, or through shared memory space in the L2 caches 1430 and 1435 or L3/main memory 1440. Other processing architectures in which these disclosures can be implemented are disclosed in U.S. patent application Ser. No. 12/555,766, filed on Sep. 8, 2009, which is incorporated by reference in its entirety herein.

Figure 15:
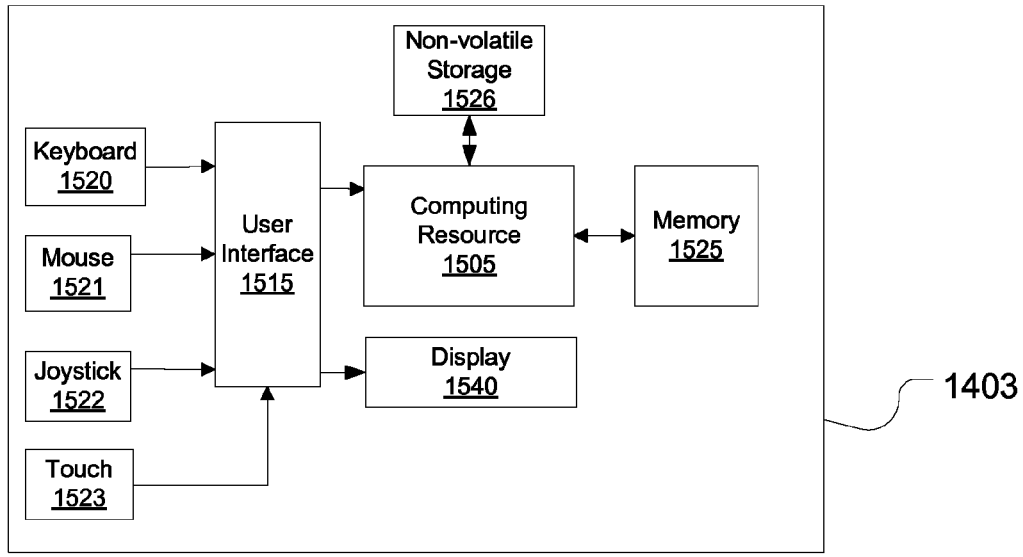
FIG. 15 illustrates a context in which the FIG. 14 system can exist.
Figure 16:
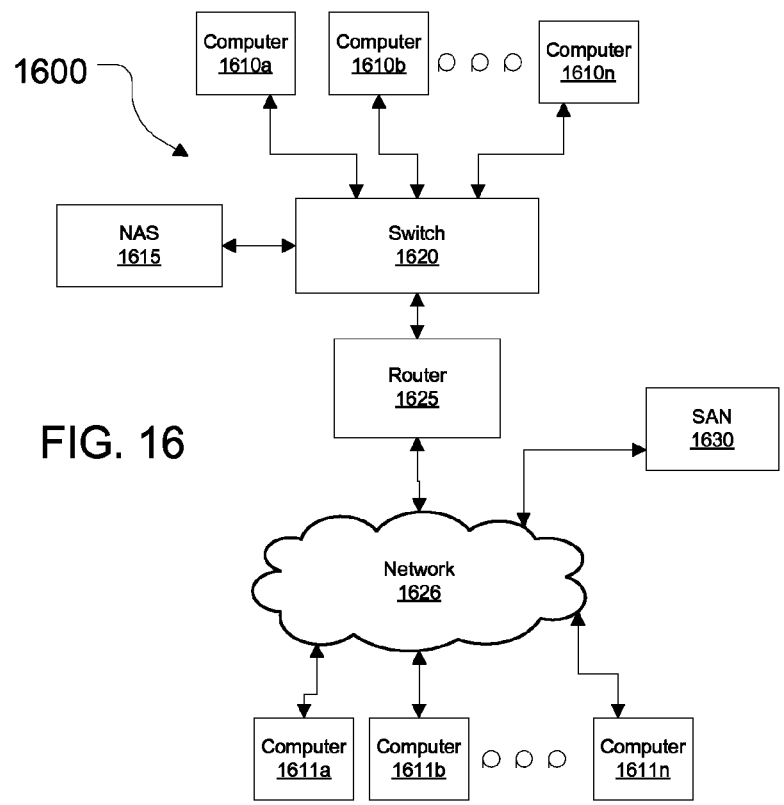
FIG. 16 illustrates networked system comprising computers, routers and switches in which the FIG. 14 system or other systems can intersection test synthetic shapes.

FIGS. 15 and 16 illustrate example contexts in which the above-described examples can be used or otherwise exist. FIG. 15 illustrates a system 1503 comprising a computing resource 1505, which can comprise the particular machine or portions thereof illustrated in FIG. 10. System 1503 also comprises a user interface comprising example components including a keyboard 1520, a mouse 1521, a joystick 1522, and touch sensing capability 1523. Other structures and approaches to obtaining user input may be provided, as needed or desired, or a subset, or none of those illustrated may be provided. System 1503 comprises a display 1540 that can receive images rendered for display, where such rendering can use the intersection testing approaches described herein. The computing resource 1505 also may communicate with a memory 1525, which may provide at least a portion of the functionality attributed to memory 1040 (FIG. 10). For example, memory 1525 may provide a large system memory implemented as DRAM, while memory 1040 provides an L3 cache implemented as SRAM. Similarly, a non-volatile storage 1526 may be both a source of data used during intersection testing and may store results of intersection testing, and/or an ultimate product of the rendering. For example, non-volatile storage 1526 may comprise one or more of magnetic media, optical media, solid-state media and so on. Non-volatile storage 1526 may store a sequence of frames, if system 1503 is rendering a motion picture, for example. Non-volatile storage 1526 may interface with computing resource 1505 through one or more intermediate components, such as components comprising a chipset.

Arrangement 1600 is illustrated as comprising a plurality of computers 1610a-1610c connected to a switch 1620, and which is also connected to a networked attached storage resource 1615. Switch 1620 connects to a router 1625 that routes across network 1626. A storage area network 1630 also is in communication with network 1626, in addition to a second plurality of computers 1611a-1611n. Arrangement 1600 can be provided, for example, to use as a rendering farm when rendering a large number of images from one or more 3-D scenes.

Computer code and associated data can be provided for implementing methods and other aspects described herein. The computer code can comprise computer executable instructions that may be, for example, binaries, intermediate format instructions such as assembly language, firmware, or source code. The code may configure or otherwise cause to be configured a general purpose computer, a special purpose computer, or a special purpose processing device to perform a certain function or group of functions.

Any such code can be stored in computer readable media, such as solid-state drives, hard drives, CD-ROMs and other optical storage means, transiently in volatile memories, such as DRAM, or less transiently in SRAM.

A variety of implementations can be provided which can include interoperative hardware, firmware and/or software that can also be embodied in any of a variety of form factors and devices, including laptops, smart phones, small form factor personal computers, personal digital assistants, and so on. Functionality described herein also can be embodied in peripherals or add-in cards. Such functionality also can be implemented on a circuit board among different chips or different processes executing in a single device, by way of further example.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

We claim:

1. A method of forming an acceleration structure for intersection testing of rays, comprising:
    receiving, from a computer readable medium, data defining at least a portion of a 3-D scene;
    identifying, based on the scene data, an object in the 3-D scene, the object having a geometric span;
    determining 3-D spatial locations and radii for a plurality of spherical acceleration elements, each respective location and radius selected so that each spherical acceleration element bounds the object, has a radius larger than the geometric span of the object, and the radius of each acceleration element is offset from the geometric span of the object; and
    storing data defining the 3-D spatial locations and radii of the spherical acceleration elements on a computer readable medium with an indication that positive intersection results between a ray and each of the plurality of acceleration elements are required to conclude that the ray may intersect the object.

2. The method of claim 1, wherein the object comprises one or more of a primitive and a group of primitives.

3. The method of claim 1, wherein the data defining the 3-D spatial locations and radii comprise data defining a first point and a second point in 3-D space, a common value for the radius of each spherical acceleration element of the plurality, and a second value determining a number of spherical acceleration elements in the plurality.

4. The method of claim 3, wherein an orbit of the second point about the first point determines a circle about which the origins of the plurality of spherical acceleration elements will be distributed when using the data to define the spherical acceleration elements.

5. The method of claim 1, wherein the plurality of acceleration elements are considered to define a synthetic bounding shape treated as a single node of a graph comprising a plurality of interrelated nodes.

6. The method of claim 1, wherein the object is an object of a group of objects to be bounded in 3-D space, the group of objects has a geometric span defined as the farthest two points apart in 3-D space of any object of the group and the determining is performed responsively to determining that the geometric span of the object group is large compared with a girth of the group of objects.

7. The method of claim 1, wherein the determining is performed responsively to determining that the object has a relatively high aspect ratio of at least one dimension to its other dimensions.

8. The method of claim 7, wherein if the object is determined to be other than a high aspect ratio object, the method further comprises determining data defining an origin and a radius for a single spherical bounding element to bound the object.

9. A non-transitory computer readable medium storing computer executable instructions for performing a method of bounding objects composing a 3-D scene to accelerate intersection testing during ray-tracing of the scene, the method comprising:
    tessellating data for an object to produce a plurality of planar primitives in the 3-D scene, and information about an aspect ratio of each of the primitives;
    producing a hierarchical acceleration structure comprising a plurality of elements connected in a graph, by actions comprising
        determining whether to produce a respective bounding element for that primitive, being either a single bounding element, or a synthetic element comprising a plurality of bounding volumes having a number, a size, and a relative arrangement, and associated with a Boolean operator, the determining comprising using the information about the aspect ratio of each of the primitives and a directive for determining when to use synthetic elements and when to use a single bounding element for the plurality of primitives;
        determining elements of the hierarchical acceleration and their relative relationships to each other, from the determined respective bounding elements for the plurality of primitives.

10. The non-transitory computer readable medium of claim 9, wherein the object comprises a plurality of primitives.

11. The non-transitory computer readable medium of claim 9, wherein the two or more bounding elements comprise four or more bounding elements and the specifying comprises defining the four or more bounding elements with data stored in only the origin and radius fields of a first and a second spherical data structure.

12. The non-transitory computer readable medium of claim 11, wherein an origin of the first spherical data structure specifies an origin of a first of the bounding elements, and an origin of the second spherical data structure specifies an origin of a last of the bounding elements, and a radius of the first data structure specifies a radius of the first bounding element.

13. The non-transitory computer readable medium of claim 12, wherein a radius of the second data structure specifies a radius of the last bounding element, and radii of intermediate bounding elements are defined by interpolating between the radii of the first and the last elements.

14. A method for accelerating intersection testing of rays and scene shapes during ray tracing, comprising:
   determining a ray to intersection test in a 3-D scene;
   testing, in an intersection testing resource, whether the ray intersects a first sphere located in the 3-D scene and bounding a shape located in the 3-D scene;
   determining whether to use results of intersection testing the first sphere as (1) a complete intersection testing result, (2) in a union operation with a result of intersection testing a second sphere, to define a synthetic shape comprising the volumes of both the first and second spheres, or (3) in an intersection operation with the second sphere to define a synthetic shape comprising only the overlapping portions of the first sphere and the second sphere, and
   if to interpret as the union operation, then determining that the synthetic shape was intersected if the first sphere was intersected, and completing intersection testing of that synthetic shape, and if to interpret as the intersection operation, then testing the second sphere only if the first sphere was intersected and determining that the synthetic shape was intersected only if both the first sphere and the second sphere were intersected; and
   using the determined intersection testing result in ray tracing the 3-D scene.

15. The method of claim 14, wherein the testing for the intersection operation is performed by determining intervals over which the ray intersected the spheres, determining that the ray intersected the synthetic element only if the intervals overlap.

16. The method for accelerating intersection testing of rays and scene shapes during ray tracing of claim 14, further comprising:
   receiving, from a computer readable medium, data defining objects located in the 3-D scene;
   identifying, based on the scene data, a geometric span of a shape located in the 3-D scene;
   determining 3-D spatial locations and radii for a plurality of spherical acceleration elements, each respective location and radius selected so that each spherical acceleration element bounds the shape, has a radius larger than the geometric span of the shape, and the radius of each acceleration element is offset from the geometric span of the shape; and
   storing data defining the 3-D spatial locations and radii of the spherical acceleration elements on a computer readable medium with an indication that positive intersection results between a ray and each of the plurality of spherical acceleration elements are required to conclude that the ray may intersect the shape, wherein the first sphere and the second sphere are comprised in the plurality of spherical acceleration elements.

17. The method for accelerating intersection testing of rays and scene shapes during ray tracing of claim 14, further comprising:
   defining nodes of geometric acceleration data that bound selections of primitives forming objects located in the 3-D scene;
   arranging the nodes in a graph with edges connecting pairs of nodes, wherein nodes represent bounding elements that either are a fundamental, single bounding shape, or a synthetic bounding shape that is defined by two or more constituent fundamental bounding shapes interpretable as defining a synthetic bounding volume based on a specified logical operation performed with intersection testing results for each of the constituent fundamental bounding shapes;
   using single fundamental bounding shapes for bounding comparatively low aspect ratio primitives and using the synthetic shape for bounding comparatively high aspect ratio primitives; and
   storing data defining the nodes, the logical operation to be performed with intersection testing results for each of the constituent fundamental bounding shapes of the nodes, and their place in the graph on a non-transitory medium, wherein
   the determining whether to use results of intersection testing the first sphere comprises accessing the stored data defining the logical operation to be performed with intersection testing results for the first sphere, and basing the determining on that accessed stored data.

18. A system for building an acceleration shape structure to use in accelerating intersection testing of rays with objects in a 3-D scene, comprising a computing resource implemented with one or more of one or more processors configured with a computer program module and one or more fixed function processing elements, the computing resource implemented for receiving a plurality of primitives descriptive of a 3-D scene and for constructing a tree comprising interrelated acceleration shape elements by using a first sphere for bounding a first selection of the primitives that have relatively low length to area ratios, and using a plurality of related spheres for bounding other selections of the primitives that have relatively high length to area ratios, the related spheres used in defining a synthetic shape by one or more of an intersection and a union operation among the plurality of related spheres.

19. A method for constructing an acceleration structure for use in identifying primitives composing a 3-D scene intersected by rays, comprising:
   forming, in a first computing resource, an abstraction of a three-dimensional scene composed of primitives, the forming comprising
      defining nodes of geometric acceleration data that bound selections of the primitives,
      arranging the nodes in a graph with edges connecting pairs of nodes, wherein
      nodes represent bounding elements that either are a fundamental, single bounding shape, or a synthetic bounding shape that is defined by two or more constituent fundamental bounding shapes interpretable as defining a synthetic bounding volume based on a specified logical operation performed with intersection testing results for each of the constituent fundamental bounding shapes;
   using single fundamental bounding shapes for bounding comparatively low aspect ratio primitives and using the synthetic shape for bounding comparatively high aspect ratio primitives; and
   storing data defining the nodes and their place in the graph on a computer readable medium.

20. The method of claim 19, further comprising storing on the computer readable medium an indication with each node that indicates whether nodes connected to that node by edges are to be interpreted as separate primitive bounding shapes or collectively as a synthetic bounding shape.

21. The method of claim 19, further comprising defining the synthetic bounding shape to comprise three or more spheres using an amount of data that can completely specify only two spheres, by interpreting the spheres of the synthetic bounding shape to have a common size radius.

22. The method of claim 21, wherein an origin of one of the two spheres defines an origin of a first sphere of a sphere sequence for the synthetic element, and an origin of the other of the two spheres specifies an origin of a last sphere in the sequence, a radius value of either the first sphere or the second sphere specifies a radius for at least the first sphere, and a ratio between overlap amount and the first radius is used in determining origins for intermediate spheres along a line segment between the first sphere and the last sphere.

23. The method of claim 21, wherein an origin of one of the two spheres defines a center, and an origin of the other sphere defines an offset from the center, which when orbited around the center defines a circle about which all origins of constituent spheres of the synthetic element will be placed, a number of constituent spheres and their radii being set by the radii values of the two spheres.

24. The method of claim 19, further comprising providing, on the computer readable medium, a data structure for the synthetic shape comprising an identifier for each sphere used in the synthetic shape.

25. An intersection tester, comprising:
a non-transitory memory; and
a tester comprising one or more of (1) one or more processors configured with machine readable code and (2) one or more fixed function processing elements, the tester configured to use the non-transitory memory to hold definition data for a ray, and to use the definition data for testing the ray for intersection serially with components of a synthetic bounding element, wherein the components of the synthetic bounding element comprise a plurality of bounding volumes that collectively bound an object located in a 3-D scene, subsequent components determined to be tested based on intersection test results from a previous component, and to determine whether or not to test geometry defining the object based on an intersection test result for the ray and the synthetic bounding element as a whole, which is generated based on test results for each component tested;
wherein a specification comprises an indication that the components of the synthetic bounding element are to be treated as one of a union and an intersection of their respective bounding volumes in defining an extent of the synthetic bounding element.

* * * * *